United States Patent [19]

Kleist et al.

[11] Patent Number: 4,790,674
[45] Date of Patent: Dec. 13, 1988

[54] IMPACT PRINTER HAVING WEAR-RESISTANT PLATINGS ON HAMMER SPRINGS AND POLE PIECE TIPS

[75] Inventors: Robert A. Kleist, Newport Beach; Norman E. Farb, Villa Park; John S. Kinley, Costa Mesa, all of Calif.

[73] Assignee: Printronix, Inc., Irvine, Calif.

[21] Appl. No.: 69,034

[22] Filed: Jul. 1, 1987

[51] Int. Cl.$^4$ .............................................. B41J 3/02
[52] U.S. Cl. ........................... 400/121; 400/174; 400/157.1; 101/93.48; 101/93.04
[58] Field of Search ............... 400/144.2, 174, 121, 400/175, 157.1, 157.3; 101/93.48, 93.05, 93.04

[56] References Cited

U.S. PATENT DOCUMENTS

| | | | |
|---|---|---|---|
| 3,884,340 | 5/1975 | Tramposch et al. | 400/174 |
| 3,919,936 | 11/1975 | Barrus et al. | 400/157.2 |
| 4,018,639 | 4/1977 | Staples, Jr. | 400/174 |
| 4,093,059 | 6/1978 | Sohl | 400/144.2 |
| 4,423,675 | 1/1984 | Luo et al. | 101/93.04 |
| 4,503,768 | 3/1985 | Whitaker | 101/93.05 |
| 4,509,421 | 4/1985 | Kurihara et al. | 101/93.48 |
| 4,532,862 | 8/1985 | Moss | 101/93.48 |

Primary Examiner—William Pieprz
Attorney, Agent, or Firm—Bogucki, Scherlacher, Mok & Roth

[57] ABSTRACT

In a dot matrix line printer in which a plurality of hammer springs mounted along the length of an elongated reciprocating hammerbank are selectively released or fired to impact dot printing impact tips mounted thereon against a print paper through a length of ink ribbon to print dots, the wear that would otherwise occur each time one of the hammer springs rebounds back into contact with a pair of pole pieces against which the hammer spring resides when in its retracted position is greatly minimized by chromium masses plated on the tip of the hammer spring and on the tips of the pole pieces. Chromium platings on each hammer spring are confined to the end of the spring and comprise either a pair of masses adjacent the different pole tips or a single mass encompassing both pole tips. The chromium masses are of convex contour and of hexavalent chromium composition to provide the masses with hard and smooth surfaces that slide over and do not abrade one another upon impacting.

17 Claims, 4 Drawing Sheets

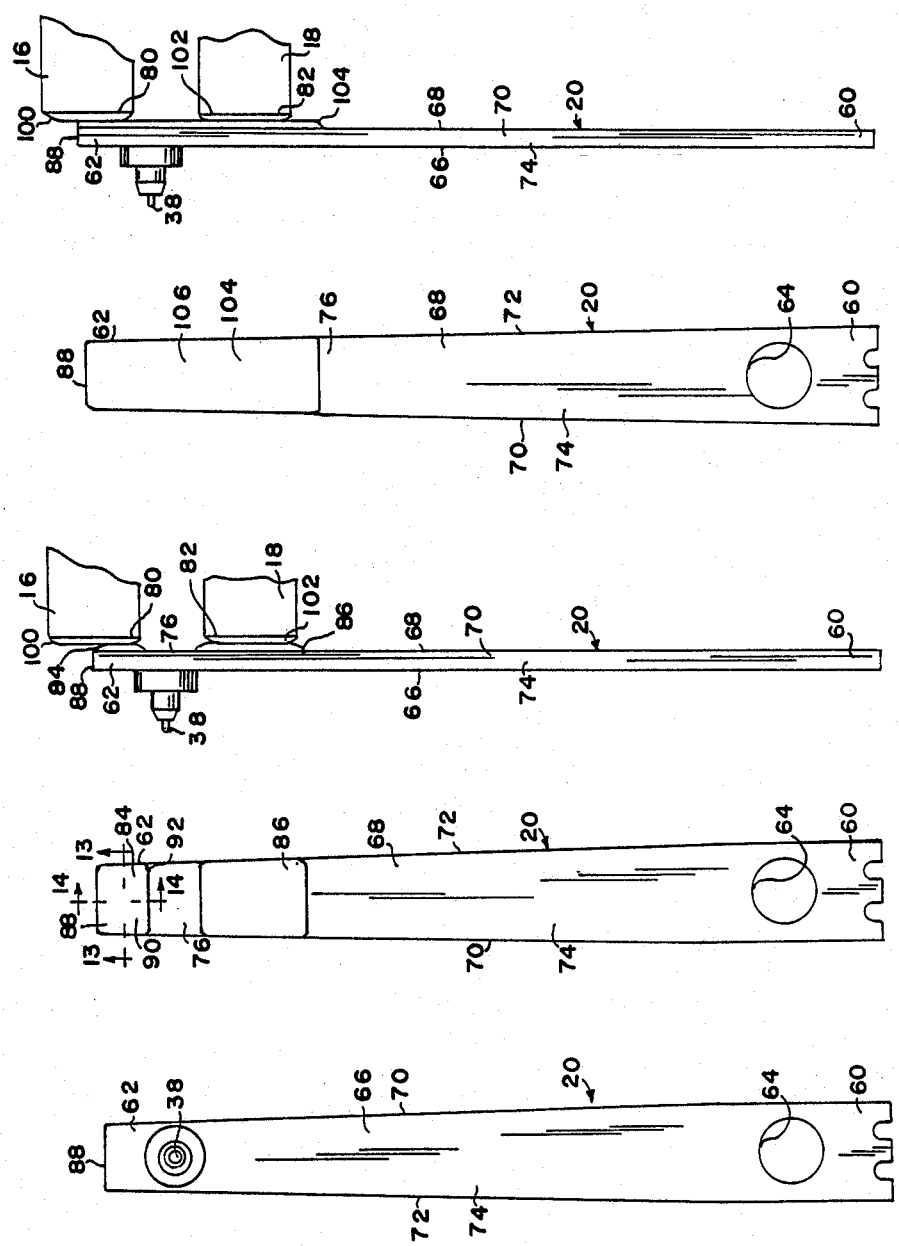

IMPACT PRINTER HAVING WEAR-RESISTANT PLATINGS ON HAMMER SPRINGS AND POLE PIECE TIPS

BACKGROUND OF THE INVENTION

1. Field of the Invention

The present invention relates to impact printers utilizing magnetically actuated hammers, and more particularly to impact printers in which hammer springs normally held magnetically in retracted positions against pole pieces are repeatedly released from the retracted positions to effect printing.

2. History of the Prior Art

Impact printers are known in which a plurality of magnetically actuated springs comprising a plurality of hammers repeatedly impact and reside against pole pieces during the operation thereof. An example of such a printer is described in U.S. Pat. No. 3,941,051 of Barrus et al., which patent is commonly assigned with the present application. The Barrus et al. patent describes a dot matrix line printer in which a plurality of hammer springs carried on a reciprocating shuttle assembly are magnetically actuated to provide the printing of dots. Each hammer spring which is of elongated configuration and of resilient magnetic material is mounted at a first end thereof so that an opposite second end thereof is free to move as the hammer spring flexes. The hammer spring is normally held in a retracted position against the tip of a pole piece by a permanent magnet which pulls the free second end of the hammer spring into contact with the tip of the pole piece. Momentary energization of a magnetic coil surrounding the pole piece causes the hammer spring to fly forward out of the retracted position, enabling a dot printing impact tip mounted at the free second end of the hammer spring to impact the print paper through an ink ribbon and thereby print a dot on the paper. Upon printing of the dot, the hammer spring rebounds into the retracted position against the pole piece tip where it is held in readiness for the next firing of the hammer spring.

Impact printers subject the hammers thereof to frequent and repeated firings during a printing operation. This is particularly true in the case of dot matrix printers such as of the type described in the previously referred to Barrus et al patent where each hammer spring in the hammer bank may be fired many times during each brief movement of the hammer bank across the width of the print paper. At the end of each such movement of the hammer bank, the hammer bank is reversed in direction and the process is repeated. Although the hammer springs and the pole pieces are made of hard, wear-resistant material such as high carbon steel, the repeated impacting of the pole pieces by the hammer springs eventually produces wear. Wear occurs at the portion of the hammer spring surface which repeatedly strikes and is held in contact with the pole piece. Wear also occurs at the interfacing tip of the pole piece.

As wear begins to occur at the pole piece tips and at the impacting surfaces of the hammer springs, both the physical and the magnetic characteristics of the hammers begin to change. Because of the extremely quick and repetitive nature of the hammer firings, the printer cannot tolerate much of a change in these characteristics. If the wear becomes excessive so as to alter the operating characteristics to a sufficient degree, the printer must be taken out of service until appropriate repairs are performed thereon. This may require replacement of the entire hammer bank with the worn hammer bank then having to be rebuilt at considerable expense.

In an effort to reduce wear at the interfaces between the pole pieces and the hammer springs, the tips of the pole pieces are frequently plated with a wear-resistant material such as chromium. This technique has had limited success in reducing the wear on the pole pieces and has done little if anything to alleviate the problem of hammer spring wear. In some cases, the presence of the chromium plating on the pole piece tips actually aggravates the problem of hammer spring wear.

In an effort to reduce hammer spring wear, attempts have been made to chrome plate the entire hammer spring, with unsatisfactory results. This appears to be due to the fact that chromium plating of the entire spring creates a bimetallic stress problem that adversely alters the mechanical characteristics of the spring.

Accordingly, it would be advantageous to provide a technique for greatly reducing wear to both the hammer springs and the pole pieces in an impact printer using hammer springs. It would furthermore be desirable to provide a protective plating for the hammer springs which has little or no effect on the operating characteristics of the springs. It would furthermore be desirable to provide a protective plating for the tips of the pole pieces which protects the pole pieces against wear without adversely affecting the wear of the hammer springs.

BRIEF SUMMARY OF THE INVENTION

In accordance with the invention, wear at the interfaces between the hammer springs and the pole pieces of impact printers using hammer springs is greatly minimized without adversely affecting the mechanical and magnetic characteristics of the hammer springs. This is accomplished by plating only the surface area of the hammer spring which contacts the one or more pole pieces associated with the hammer spring with one or more masses of wear-resistant material such as chromium. At the same time, the tip of each pole piece is plated with a mass of wear-resistant material such as chromium.

The masses of chromium or other wear-resistant material in accordance with the invention are plated on the hammer springs and on the pole pieces so as to have relatively smooth surfaces which are absent any abruptly raised or jagged portions and which do not have outer edges that are raised above and thicker than the central portions thereof. Preferably, the masses of chromium have slightly convex contours in which the central region of each plated mass is slightly thicker than the thickness of the mass at the outer edges thereof. The plated masses of convex contour have been found to undergo very little wear with prolonged use, apparently due to the ability of such configuration to accommodate the sliding and rolling motions that accompany each impacting of the pole piece by the hammer spring.

Wear resistance may also be enhanced by the use of hexavalent chromium which provides the masses with relatively smooth surfaces of extreme hardness. In a particular printer arrangement according to the invention, each hammer spring impacts a pair of parallel, spaced-apart pole pieces at the free upper to second end of the spring. The opposite lower or first end of the elongated hammer spring is employed to mount the hammer spring on a frame structure. The free upper or second end of the hammer spring has a dot printing impact tip mounted on a broad surface thereof. An opposite broad surface at the free upper or second end of the hammer spring impacts the tips of the pole pieces and therefore defines a pole piece-receiving surface. One or two masses of chromium are plated on the pole piece-receiving surface. Where two plated masses are used, each mass is located adjacent the tip of a different one of the pole pieces. Where a single chromium mass is used, the single mass is large enough to encompass the areas adjacent the tips of both pole pieces. The plated masses of chromium are confined to the pole piece-receiving surface of the hammer spring at the free upper or second end thereof and do not extend along most of the total length of the hammer spring. In this way, the hammer spring can be protected against impact-related wear without interfering with the mechanical or magnetic characteristics thereof. The tips of the pair of pole pieces also have masses of chromium plated thereon.

In those prior art printers where the tips of the pole pieces were plated with chromium, the wear problem was not significantly reduced as noted above. This is apparently because the chromium was plated on the pole piece tips with little or no regard to the contour of the resulting plated mass. Such plated mass typically assumed a generally concave configuration in which the thickness of the plated mass was greatest at the edges thereof and often was further characterized by jagged portions, particularly at the outer edges. Such a configuration combined with the needle-like crystalline structure of the trivalent chromium typically used, with the result that the plated mass of chromium had a jagged, almost saw-tooth-like surface. While this provided adequate protection for the tip of the pole piece, it had a very abrasive effect on the mating, pole piece-receiving surface of the hammer spring.

In accordance with the invention, each pole piece tip is plated with a mass of chromium having a smooth surface which at the very least is flat and which preferably is of slightly convex contour such that the central region of the plated mass has a thickness slightly greater than the thickness of the mass at the edges thereof which coincide with the edges of the tip surface of the pole piece. Such configuration provides protection for the tip of the pole piece without having an adverse effect on the hammer spring or on the chromium mass or masses plated on the hammer spring. Surface smoothness and hardness are further enhanced by preferably making the plated chromium masses on the hammer spring as well as on the pole piece tip of hexavalent chromium instead of trivalent chromium. The plated masses preferably have a maximum thickness on the order of 200–700 millionths of an inch. The convex contours of the plated masses readily accommodate the sliding and rolling motions that occur upon impacting of the pole piece by the hammer spring so as to further minimize wear thereof. The plated masses are of nonmagnetic chromium and therefor define a small nonmagnetic gap between the hammer spring and the pole pieces. This reduces unnecessary flux buildup in the magnetic circuit so that lower values of coil current may be used to release or fire the hammer spring.

BRIEF DESCRIPTION OF THE DRAWINGS

A better understanding of the invention may be had by reference to the following description taken in conjunction with the accompanying drawings, in which:

FIG. 3 is a front view of one of the hammer springs of the hammer bank of FIG. 1;

FIG. 4 is a rear view of the hammer spring of FIG. 3 illustrating one embodiment in which two wear-resistant masses are plated on the hammer spring;

FIG. 6 is a side view of the hammer spring embodiment of FIG. 4 together with an associated pair of pole pieces;

FIG. 8 is a rear view of the hammer spring of FIG. 3 illustrating an alternative embodiment in which a single wear-resistant mass is plated on the hammer spring;

FIG. 10 is a side view of the hammer spring embodiment of FIG. 8 together with an associated pair of pole pieces;

DETAILED DESCRIPTION

Figure 1:
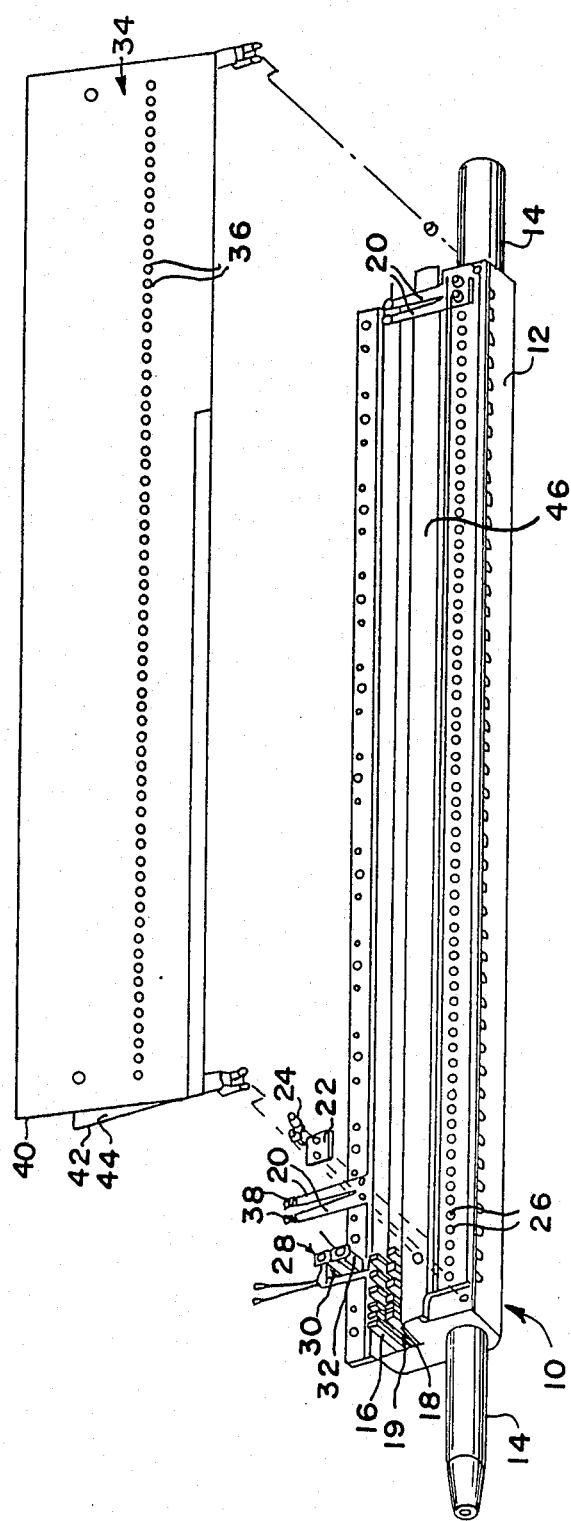
FIG. 1 is an exploded perspective view of a hammer bank having wear-resistant platings in accordance with the invention.

FIG. 1 is an exploded perspective view of a hammer bank 10. The hammer bank 10 which is designed for use in a dot matrix impact line printer has wear-resistant platings on the hammer springs and pole piece tips thereof in accordance with the invention.

The hammer bank 10 shown in FIG. 1 is designed for use in a dot matrix line printer of the general type described in previously referred to U.S. Pat. No. 3,941,051 of Barrus et al. However, the hammer bank 10 is somewhat different from the hammer bank described in the Barrus et al patent, having a greater number of hammers and being comprised of magnetic hammer actuators which are of different configuration and which employ two pole pieces and two coils in conjunction with each hammer spring. Nevertheless, the hammer bank 10 of FIG. 1 is shown and described herein for purposes of illustrating only, and it should be understood that the invention is applicable to the hammer bank described in the Barrus et al patent as well as to other types of hammer banks including those for use with impact printers which are not of the dot matrix type and those which do not use permanent magnet retract of the hammer springs.

The hammer bank 10 which is described in greater detail in copending application Ser. No. 69,021 of Farb et al., PRINTER HAVING IMPROVED HAMMERBANK, which application was filed July 1, 1987 and is commonly assigned with the present application, is comprised of a frame 12 of elongated configuration having a shaft 14 extending therethrough. The shaft 14 assists in mounting the frame 12 in a manner which permits the reciprocating motion of the hammer bank 10 necessary for printing. The frame 12 has a plurality of pairs of pole pieces mounted along the length thereof. Each pair of pole pieces is comprised of a first pole piece 16 and a second pole piece 18. Each pair of the pole pieces 16 and 18 which has a permanent magnet 19 disposed therebetween is associated with a different one of a plurality of hammer springs 20 mounted in spaced apart, generally parallel fashion along the length of the frame 12. The hammer springs 20 are divided into pairs for mounting purposes. Each pair of the hammer springs 20 is mounted on the frame 12 by a different mounting plate 22 and a pair of screws 24. The screws 24 extend through the mounting plates 22, through a lower first end of the hammer springs 20 and then into apertures 26 in the frame 12.

A different coil assembly 28 is mounted on each pair of the pole pieces 16 and 18. The coil assembly 28 is comprised of first and second coils 30 and 32 for disposition respectively on the first and second pole pieces 16 and 18.

The hammer bank 10 has sixty six of the hammer springs 20 mounted along the length of the frame 12 thereof. Each of the sixty six hammer springs 20 has a different pair of the pole pieces 16 and 18 associated therewith. Only six pairs of the pole pieces 16 and 18 and one of the coil assemblies 28 are shown in FIG. 1 for simplicity of illustration. In reality, however, there is a different coil assembly 28 mounted on each pair of the pole pieces 16 and 18 across the length of the frame 12.

A cover assembly 34 is mounted on the frame 12 so as to extend along the length thereof. The cover assembly 34, which is shown spaced-apart from the frame 12 in FIG. 1 for convenience of illustration, is mounted on the frame 12 so as to be disposed in close proximity to the hammer springs 20. The cover assembly 34 is provided with a row of apertures 36 extending along the length thereof. Each of the apertures 36 is disposed adjacent a dot printing impact tip 38 on a different one of the hammer springs 20. The cover assembly 34 is folded so that front and rear panels 40 and 42 thereof define an interior compartment 44 therebetween in which an ink ribbon (not shown) normally resides. The rear panel 42 is provided with a row of apertures that align with the apertures 36 in the front panel and with the dot printing impact tips 38.

Each of the hammer springs 20 is normally held in a spring-loaded retracted position against the pole pieces 16 and 18 by the permanent magnet 19. The hammer spring 20 is released from its retracted position or "fired" by energization of the associated coil assembly 28. When this happens the hammer spring 20 moves away from the pole pieces 16 and 18 and toward the cover assembly 34. The dot printing impact tip 38 mounted on an upper free second end of the hammer spring 20 enters an associated aperture in the rear panel 42 and impacts the ink ribbon through an associated aperture 36 in the front panel 40 and against a platen-supported length of print paper (not shown in FIG. 1) disposed at the front of the cover assembly 34. The hammer spring 20 then rebounds back into contact with the pole pieces 16 and 18 where it is held in the retracted position by the permanent magnet 19 in readiness for the next firing thereof. Rebounding of the hammer spring 20 back into contact with the pole pieces 16 and 18 is damped by a Kapton strip 46 mounted along the length of the hammerbank 10 adjacent intermediate portions of the hammer springs 20. The Kapton strip 46 is comprised of several layers of Kapton sandwiched together.

Figure 2:
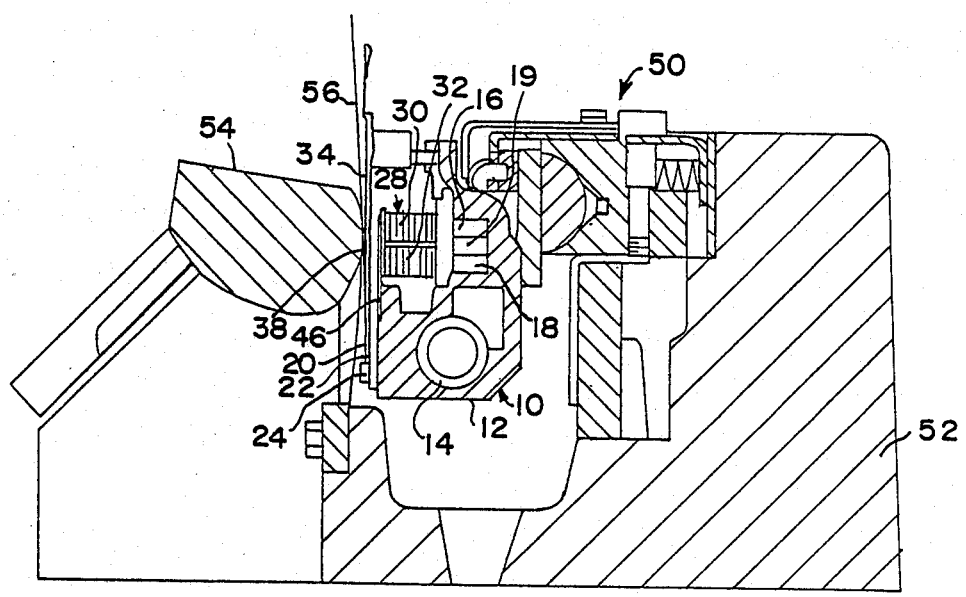
FIG. 2 is a sectional view of the hammer bank of FIG. 1 together with adjacent portions of a printer in which the hammer bank is used.
Figure 7:
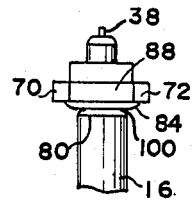
FIG. 7 is a top view of the arrangement shown in FIG. 6.
Figure 11:
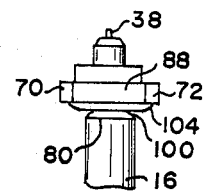
FIG. 11 is a top view of the arrangement of FIG. 10.

FIG. 2 is a sectional view of the hammer bank 10 mounted in its operative position within a printer 50. The printer 50 includes a frame assembly 52 in which the hammer bank 10 is mounted so as to undergo reciprocating motion relative to a stationary platen 54. The hammer bank 10 is driven in reciprocating fashion using appropriate apparatus such as the counterbalanced cam drive described in the previously referred to U.S. Pat. No. 3,941,051 of Barrus et al.

As the hammer bank 10 is reciprocated relative to the stationary platen 54, the various hammer springs 20 are selectively released or fired to print dots on a length of print paper 56 disposed between the platen 54 and the cover assembly 34. As previously described, the upper free second end of the hammer spring 20 moves away from the pole pieces 16 and 18 and toward the cover assembly 34 of the platen 54 upon firing. The dot printing impact tip 38 impacts an ink ribbon carried within the cover assembly 34 against the paper 56 which is supported against the platen 54 to print a dot on the paper 56. The hammer spring 20 then rebounds back into contact with the pole piece 16 and 18.

The pole pieces 16 and 18 are of elongated configuration and are disposed in spaced-apart, parallel relation as shown in FIG. 2. The coils 30 and 32 of the coil assembly 28 are mounted on the pole pieces 16 and 18 respectively on the forward ends of the pole pieces 16 and 18 and adjacent the hammer spring 20. The permanent magnet 19 is disposed between the pole pieces 16 and 18 at the rear ends thereof. The hammer spring 20 which would otherwise assume an unflexed vertical or neutral position is pulled into the retracted position against the pole pieces 16 and 18 by the permanent magnet 19 which completes a magnetic path through the pole pieces 16 and 18 and the adjacent upper end of the hammer spring 20. The hammer spring 20 remains in the retracted position against the pole pieces 16 and 18 and slightly flexed from the neutral position until the coils 30 and 32 are energized to fire the hammer spring 20. Energization of the coils 30 and 32 overcomes the effects of the permanent magnet 19 and sends the hammer spring 20 flying toward the ribbon and the print paper 56 in the manner previously described.

Figure 5:
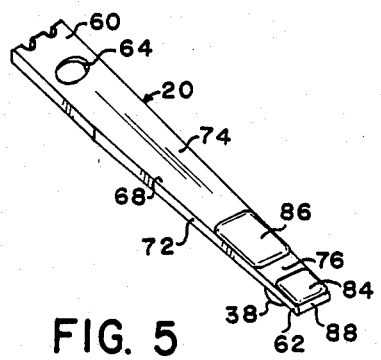
FIG. 5 is a perspective view of the hammer spring embodiment of FIG. 4.
Figure 9:
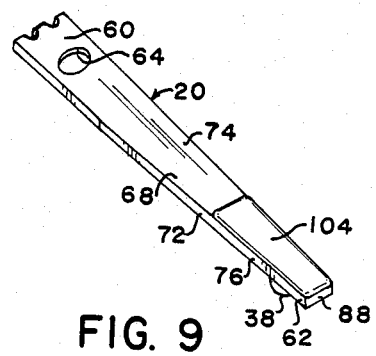
FIG. 9 is a perspective view of the hammer spring embodiment of FIG. 8.

FIGS. 3-5 show the hammer spring 20 in detail. As shown therein, the hammer spring 20 is of elongated configuration between a lower first end 60 thereof and a free upper second end 62 thereof. The lower first end 60 of the hammer spring 20 is used to rigidly mount the hammer spring 20 on the frame 12 of the hammer bank 10 and includes an aperture 64 therein for receiving one of the screws 24 shown in FIG. 1.

The hammer spring 20, which is made of high carbon steel in the present example, is of relatively thin, generally planar configuration so as to have opposite broad surfaces extending along the length thereof. One of the broad surfaces comprises a front surface 66 while the other broad surface is an opposite rear surface 68. The hammer spring 20 has a generally uniform thickness between the front and rear surfaces 66 and 68 along the length thereof. The dot printing impact tip 38 is mounted on the front surface 66 at the free upper second end 62. A pair of opposite side edges 70 and 72 define the width of the hammer spring 20 therebetween. As shown in FIGS. 3 and 4 the width tapers slightly by undergoing a gradual decrease in an upper direction beginning with the top of the lower first end 60 and ending at the top of the upper second end 62. Most of the length of the hammer spring 20 is comprised of an intermediate portion 74 thereof which extends between the lower first end 60 and the free upper second end 62.

FIG. 6 shows the hammer spring 20 together with the first and second pole pieces 16 and 18. The first and second coils 30 and 32 of the coil assembly 28 which surround most of the forward ends of the pole pieces 16 and 18 are omitted from FIG. 6 for clarity of illustration. The hammer spring 20 is shown in its spring-loaded retracted position against the pole pieces 16 and 18. With the hammer spring 20 in the retracted position, the pole pieces 16 and 18 are received by a pole piece-receiving surface 76 comprising a portion of the rear surface 68 at the upper free second end 62 of the hammer spring 20.

The first pole piece 16 terminates in an outer end surface defining a tip 80 of the first pole piece 16. In similar fashion, the second pole piece 18 terminates in an outer end surface defining a tip 82 of the second pole piece 18. During printing the hammer spring 20 is fired or released from the retracted position shown in FIG. 6 repeatedly. Each time the hammer spring 20 is fired so as to print a dot on the print paper 56, the free upper second end 62 of the hammer spring 20 impacts the pole piece tips 80 and 82 upon return of the hammer spring 20. This repeated impacting of the pole piece tips 80 and 82 by the pole piece-receiving surface 76 of the hammer spring 20 would normally cause substantial wear of the tips 80 and 82 and the surface 76 in the absence of water-resistant platings. As previously described, this wear can greatly shorten the useful life of the hammer bank 10.

In accordance with the invention and as hereafter described, the pole piece-receiving surface 76 is plated with one or more masses of chromium, as are the pole piece tips 80 and 82. The chromium mass or masses plated on the pole piece-receiving surface 76 of the hammer spring 20 are confined to the free upper second end 62 of the hammer spring 20 which comprises a relatively small portion of the length of the hammer spring 20. In this manner the dynamic characteristics of the hammer spring 20 are not adversely affected. At the same time, the pole piece-receiving surface 76 is protected from wear.

In accordance with the invention, the masses of chromium plated on the pole piece-receiving surface 76 of the hammer spring 20 and the tips 80 and 82 of the pole pieces 16 and 18 have relatively smooth surfaces which are absent any abruptly raised or jagged portions and which do not have outer edges that are raised above and thicker than the central portions thereof. Preferably, the chromium masses are of convex contour such that the central portion of each mass of chromium is of slightly greater thickness than the thickness of the mass at the edges thereof. This provides each chromium mass with a bubble-like surface of considerable smoothness and extreme hardness which does not adversely affect the opposing chromium mass which it impacts and resides against. The dynamics of the impacting of the pole piece tips 80 and 82 are characterized by the striking of the tips 80 and 82 by the pole piece-receiving surface 76, followed by a sliding and rolling motion of the pole piece-receiving surface 76 relative to the tips 80 and 82 as a result of secondary and tertiary vibrations of the hammer spring 20. The ability of the opposing chromium masses to slide and roll as a result of such motion without abraiding or deteriorating is largely due to the convex contour of the masses as well as the relatively smooth and extremely hard outer surfaces thereof and the intrinsic low coefficient of friction between chromium plated surfaces.

In accordance with the invention, the wear-resistant masses plated on the pole piece-receiving surface 76 of the hammer spring 20 and the tips 80 and 82 of the poles pieces 16 and 18 are preferably of hexavalent chromium. While other forms of chromium such as trivalent chromium are somewhat easier to plate and can also be used, they lack the degree of hardness which is often desired. Also, the surface of trivalent chromium has a needle-like crystalline structure which causes abrasion of other surfaces coming in contact therewith. Hexavalent chromium, on the other hand, is harder and more wear-resistant. Its crystalline structure provides a smoother surface which is less abrasive.

In one particular example shown in FIGS. 3–7, the hammer spring 20 has two different chromium masses 84 and 86 plated on the pole piece-receiving surface 76 thereof. The first chromium mass 84 extends across the entire width of the hammer spring 20 between the side edges 70 and 72. The chromium mass 84 which has a central region 90 extends along a portion of the length of the pole piece-receiving surface 76 from a top edge 88 of the hammer spring 20. The chromium mass 84 terminates at a lower edge 92 thereof. The first chromium mass 84 is located so as to receive the tip 80 of the first pole piece 16.

Figure 13:
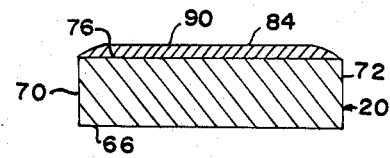
FIG. 13 is a sectional view of the hammer spring embodiment of FIG. 4 taken along the line 13—13 thereof.
Figure 14:
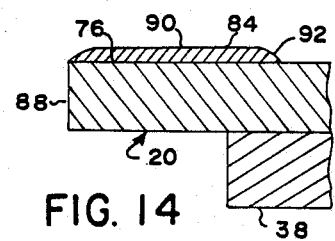
FIG. 14 is a sectional view of the hammer spring embodiment of FIG. 4 taken along the line 14—14 thereof.

The chromium mass 84 is of convex contour such that the thickness thereof at the central region 90 thereof is slightly greater than the thickness thereof at the edges thereof. This is shown by FIGS. 13 and 14 which are sectional views of the portion of the free upper second end 62 which includes the first chromium mass 84 taken at right angles to each other. FIG. 13 shows that the thickness of the chromium mass 84 at the central region 90 thereof is slightly greater than the thickness of the mass 84 at the opposite edges thereof along the side edges 70 and 72 of the hammer spring 20. FIG. 14 shows that the thickness of the chromium mass 84 at the central region 90 thereof is slightly greater than the thickness at the upper edge thereof coincident with the top edge 88 of the hammer spring 20 and the thickness at the lower edge 92 thereof.

The second chromium mass 76 which is also of convex contour is spaced-apart from the first chromium mass 84 and extends along a lower portion of the pole piece-receiving surface 76. The chromium mass 86 extends across the entire width of the hammer spring 20 between the side edges 70 and 72, and is located so as to receive the tip 82 of the second pole piece 18.

The chromium masses 84 and 86 are confined to the pole piece-receiving surface 76 at the free upper second end 62 of the hammer spring 20. Accordingly, the chromium masses 84 and 86 do not adversely affect the dynamic operating characteristics of the hammer spring 20. At the same time, the chromium masses 84 and 86 are strategically located so as to protect the pole piece-receiving surface 76 from wear caused by the contacting thereof by the tips 80 and 82 of the pole pieces 16 and 18.

The tip 80 of the first pole piece 16 is plated with a chromium mass 100. In like fashion, the tip 82 of the second pole piece 18 is plated with a chromium mass 102. The chromium masses 100 and 102 are also of convex contour so as to have a thickness at a central region thereof which is slightly greater than the thickness at the opposite edges thereof which coincide with the edges of the surfaces defining the tips 80 and 82.

An alternative arrangement is shown in FIGS. 8-11. In the embodiment of FIGS. 8-11, the hammer spring 20 has a single chromium mass 104 plated on the pole piece-receiving surface 76 thereof. The chromium mass 104 extends across the entire width of the rear surface 68 between the side edges 70 and 72 of the hammer spring 20. The chromium mass 104 extends along the length of the hammer spring 20 between the top edge 88 and the lower extremity of the pole piece-receiving surface 76 so as to receive the chromium masses 100 and 102 on the tips 80 and 82 of the pole pieces 16 and 18. As in the case of the chromium masses 84 and 86 of the embodiment of FIGS. 3-7, the chromium mass 104 is confined to the free upper second end 62 of the hammer spring 20 and does not extend along the major portion of the length of the hammer spring 20 represented by the intermediate portion 74 and the lower first end 60. As in the case of the chromium masses 84 and 86 and the chromium masses 100 and 102, the chromium mass 104 is of convex contour such that the thickness thereof at a central region 106 thereof is greater than the thickness thereof at the edges of the mass 104.

Figure 12:
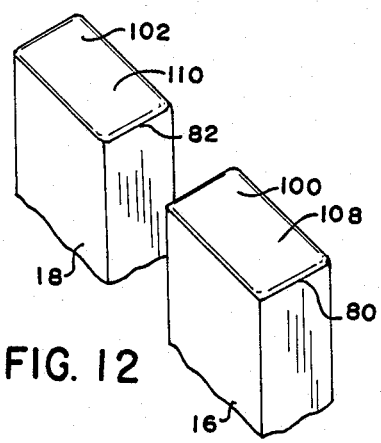
FIG. 12 is a perspective view of the pair of pole pieces in FIGS. 6 and 10 illustrating the wear-resistant masses plated on the tip surfaces thereof.

The first and second pole pieces 16 and 18 are shown in greater detail in FIG. 12. As shown in FIG. 12, each of the pole pieces 16 and 18 is of elongated, generally cylindrical configuration. The tips 80 and 82 of the pole pieces 16 and 18 comprise flat surfaces on which the chromium masses 100 and 102 are plated. The chromium masses 100 and 102 extend over the entire surface areas of the tips 80 and 82 and terminate at the edges of the surfaces. The chromium mass 100 is of convex contour so as to have a thickness at a central region 108 thereof which is greater than the thickness of the mass 100 at the opposite edges thereof. Similarly, the chromium mass 102 is of convex contour and has a thickness at a central region 110 thereof which is greater than the thickness of the mass 102 at the opposite edges thereof.

In the present examples, the hammer spring 20 is 1.20 inches long and is 0.10 inches wide at the top edge 88 thereof and 0.146 inches wide at the lower first end 60 thereof. The thickness of the hammer spring 20 between the front surface 66 and the rear surface 68 is 0.03 inches. The chromium masses 84, 86, 100, 102 and 104 are plated to a thickness of 200-700 millionths of an inch and preferably a thickness of 200-500 millionths of an inch. The chromium mass 84 is 0.08 inches long between the top edge 88 of the hammer spring 20 and the lower edge 92 thereof, while the chromium mass 86 is 0.165 inches long. The chromium mass 104 is 0.355 inches long.

A further advantage provided by the chromium masses 84, 86, 100, 102 and 104 resides in the magnetic gaps defined thereby when the hammer spring 20 is in the retracted position. Thus, the chromium masses 84 and 100 define a nonmagnetic gap between the hammer spring 20 and the first pole piece 16 and the chromium masses 86 and 102 define a nonmagnetic gap between the hammer spring 20 and the second pole piece 18 in the embodiment of FIGS. 4-7. In the embodiment of FIGS. 8-11, the chromium mass 104 combines with the chromium masses 100 and 102 to form similar nonmagnetic gaps. The nonmagnetic gaps reduce unnecessary flux buildup in the magnetic circuits so that lower values of current may be applied to the coils 30 and 32 to effect hammer spring release.

The various chromium masses may be plated on the hammer springs and on the pole pieces using conventional plating techniques. The chromium masses are confined to the selected areas of the hammer springs and the pole pieces using selective plating techniques. Such selective plating can be accomplished by contacting only the areas to be plated with electrolyte, or by immersion with protective tape or organic coatings being applied to those areas that are not to be plated. The convex contours may be achieved by control of the distribution of cation current density over the face of the area to be plated such as through the use of shaped lead anodes with the part to be plated forming the cathode. Plating of hexavalent chromium may be provided through careful control of plating parameters. With chromium trioxide as the starting material, careful maintenance of electrodes, temperature and electrolyte will produce hexavalent chromium.

While there have been described above and illustrated in the drawings a number of variations, modifications and alternative forms, it will be appreciated that the scope of the invention defined by the appended claims and includes all forms comprehended thereby.

What is claimed is:

1. A magnetic hammer actuator for use in an impact printer, said actuator comprising the combination of an elongated, resiliently flexible, essentially flat hammer spring having essentially uniform thickness, having an intermediate portion and having an opposite, free second end thereof on the other side of the intermediate portion from the first end, the second end having a pole piece-receiving surface, at least one pole piece having a tip thereof disposed adjacent the pole piece-receiving surface of the second end of the hammer spring, a permanent magnet magnetically coupled to the at least one pole piece and operative to normally hold the hammer spring in a retracted position against the at least one pole piece with the pole piece receiving surface engaging the tip of the pole piece, a coil associated with the at least one pole piece and operative when momentarily energized to release the hammer spring from the retracted position, the hammer spring when released from the retracted position moving away from the at least one pole piece to perform impact printing and then returning to the retracted position where it impacts the tip of the at least one pole piece, and a mass of wear-resistant material consisting essentially of hexavalent chromium plated on the pole piece-receiving surface of the second end of the hammer spring, the mass of wear-resistant material being confined to the pole piece-receiving surface at the second end of the hammer spring and being operative to minimize wear of the pole piece-receiving surface and being of generally convex configuration such that a central region of the mass is thicker than the thickness of the mass at the edges thereof.

2. The invention set forth in claim 1, wherein the mass of wear-resistant material is essentially confined to a region of the pole piece-receiving surface which contacts the tip of the at least one pole piece.

3. The invention set forth in claim 1, wherein the magnetic hammer actuator has a pair of spaced-apart, generally parallel pole pieces, each having a tip disposed adjacent a different portion of the pole piece-receiving surface at the second end of the hammer spring, the mass of wear-resistant material is essentially confined to a region of the pole piece-receiving surface which contacts the tip surface of a first one of the pair of pole pieces, and further including a second mass of wear resistant material consisting essentially of hexavalent chromium plated on the pole piece-receiving surface at the second end of the hammer spring, the second mass of wear-resistant material being spaced-apart from the first-mentioned mass of wear-resistant material and being essentially confined to a region of the pole piece-receiving surface which contacts the tip of a second one of the pair of pole pieces and being of generally convex configuration such that a central region of the mass is thicker than the thickness of the mass at the edges thereof.

4. The invention set forth in claim 1, wherein the magnetic hammer actuator has a pair of spaced-apart, generally parallel pole pieces, each having a tip disposed adjacent a different portion of the mass of wear-resistant material plated on the pole piece-receiving surface at the second end of the hammer spring.

5. The invention set forth in claim 2, further including a second mass of wear resistant material consisting essentially of hexavalent chromium plated on the tip of the at least on pole piece and being of generally convex configuration such that a central region of the second mass is thicker than the thickness of the second mass at the edges thereof.

6. The invention set forth in claim 1, wherein the hammer spring is made of high carbon steel.

7. A hammer spring for use in an impact printer, the spring being of elongated, essentially flat and uniform thickness configuration between opposite first and second ends thereof, the first end of the spring being adapted to mount the spring on a support structure and the second end having at least one mass of hexavalent chromium plated thereon, the mass of hexavalent chromium being confined to the surface for engaging a pole piece at the second end of the spring and being of generally convex configuration such that a central region of the mass is thicker than the thickness of the mass at the edges thereof.

8. The invention set forth in claim 7, wherein the spring has opposite broad surfaces extending along the length thereof between side edges of the spring and the mass of hexavalent chromium extends across the width of one of the broad surfaces of the spring between the side edges and along a portion of the length of the spring which is confined to the second end of the spring.

9. The invention set forth in claim 8, wherein the mass of hexavalent chromium is of generally rectangular configuration.

10. The invention set forth in claim 7, further including a second mass of hexavalent chromium plated on the spring, the second mass of hexavalent chromium being confined to the surface for engaging a pole piece and being spaced-apart from the first-mentioned mass of hexavalent chromium and being of generally convex configuration such that a central region of the mass is thicker than the thickness of the mass at the edges thereof.

11. The invention set forth in claim 7, further including a dot printing impact tip mounted at the second end of the spring on a surface of the spring opposite the mass of hexavalent chromium.

12. The invention set forth in claim 7, wherein the mass of hexavalent chromium has a thickness of 200–500 millionths of an inch.

13. The invention set forth in claim 7, wherein the mass of hexavalent chromium has a thickness of 400–700 millionths of an inch.

14. A hammer spring for use in an impact printer, the spring being comprised of high carbon steel and being of elongated configuration between opposite first and second ends thereof and being of relatively thin, generally planar configuration and having essentially uniform thickness between opposite front and rear surfaces, the first end of the spring being configured to mount the spring on a support structure, a dot printing impact tip mounted on the front surface of the spring at the second end thereof, and a mass of hexavalent chromium plated on the rear surface of the spring opposite the dot printing impact tip at the second end of the spring, the mass of hexavalent chromium extending across the rear surface of the spring between opposite edges of the spring and along a portion of the length of the spring which is confined to the second end of the spring, the mass of hexavalent chromium having a convex configuration so as to have a thickness at a central region of which is greater than the thickness of the mass at the edges thereof.

15. The invention set forth in claim 14, further including a second mass of hexavalent chromium plated on the rear surface of the spring opposite the dot printing impact tip at the second end of the spring, the second mass of hexavalent chromium being spaced apart from the first-mentioned mass of hexavalent chromium and extending across the rear surface of the spring between opposite edges of the spring and along a portion of the length of the spring which is confined to the second end of the spring, the second mass of hexavalent chromium having a convex configuration so as to have a thickness at a central region thereof which is greater than the thickness of the second mass at the edges thereof.

16. A pole piece for use with a hammer in an impact printer, the pole piece being of magnetic material and having a tip for engagement by a hammer, the pole piece having a mass of hexavalent chromium plated on the tip thereof, the mass of chromium being of convex configuration such that the thickness of the mass at a central region thereof is greater than the thickness of the mass at the edges thereof.

17. The invention set forth in claim 16, wherein the mass of hexavalent chromium has a thickness of 200–700 millionths of an inch.

* * * * *